Patented Aug. 26, 1952

2,608,464

UNITED STATES PATENT OFFICE 2,608,464

PREPARATION OF TITANIUM AND ZIRCONIUM TETRAHALIDES

Leif Aagaard, Plainfield, and George E. Bronson, Matawan, N. J., assignors to National Lead Company, New York, N. Y., a corporation of New Jersey No Drawing. Application August 10, 1950, Serial No. 178,752

6 Claims. (Cl. 23—87)

This invention relates to the preparation of titanium and zirconium tetrahalides. More specifically it relates to a method for preparing the tetrahalides of titanium or zirconium from their respective phosphates.

Many processes have been proposed for the preparation of tetrahalides of titanium and zirconium. Most of these processes involve a chlorination method. In most chlorination processes large volumes of gaseous chlorine must be handled which presents difficult and uneconomical processing conditions.

An object of the invention, therefore, is to present a new and efficient method for producing tetrahalides of titanium or zirconium. A further object is to present a process which does not involve the use of gaseous reactants. These and other objects will become more apparent from the following complete description of the present invention.

In its broadest aspects this invention contemplates a process for production of tetrahalide of a metal selected from the group consisting of titanium and zirconium which comprises admixing a phosphate of said metal and a halide of a metal from the group consisting of alkaline earth metals and magnesium, and heating the mixture, at a temperature at least substantially as high as the melting point of said alkaline earth metal or magnesium halide, until the tetrahalide of said first mentioned metal is separated as a volatilized product. More specifically it relates to the production of titanium or zirconium tetrahalide by heating at elevated temperatures a phosphate of titanium or zirconium admixed with an alkaline earth metal or magnesium halide, preferably a halide of calcium or magnesium, and the halide preferably being a bromide, chloride or iodide.

All of the members of the alkaline earth metals group and magnesium may be employed but it is preferred to use calcium and magnesium since the reaction proceeds at lower temperatures with these agents. When barium and strontium are employed instead of calcium and magnesium, temperatures up to 200° C. above those required with calcium and magnesium must be employed to obtain high yields.

It is possible to produce tetrahalides of titanium and zirconium from all of the members of the alkaline earth metal and magnesium halide group, but it is preferred to use the chlorides, bromides or iodides in preference to the fluorides. Again high temperatures must be employed in producing tetrafluorides to obtain high yields. Because of the thermal limitations of the materials employed for carrying out the reaction and because of the corrosiveness of the reactants and products, it is desirable to use the elements which react at the lower temperatures.

The reaction is simple to employ and economical to operate. Almost any type of corrosion-resistant material such as glass may be used, providing it will withstand the reaction temperatures involved. The reaction may be carried out at temperatures at least substantially as high as the melting point of the alkaline earth metal or magnesium halide and preferably higher to obtain a rapid reaction. For most reagents temperatures between 800° C. and 900° C. produce high yields at a rapid rate. By employing mixtures of halide salts which form low melting eutectics, it is also possible to produce the tetrahalides of zirconium and titanium at the melting temperatures of the eutectics.

The presence of moisture is detrimental to the reaction because of the formation of nonvolatile oxyhalides. Moisture may be avoided either by drying the reactants separately or by drying the reaction mixture at a temperature below that at which the reaction takes place. In carrying out the process the reactants are preferably dried separately and are intimately mixed and placed in a suitable reaction chamber. The reaction chamber is heated externally by a furnace surrounding the chamber and the mass is heated to the desired temperature. As the reaction proceeds the volatilized tetrahalide is removed from the reaction chamber by distillation and is condensed and collected in a separate container.

The reaction usually involves two reactants, which normally form a thick paste which creates difficulties in obtaining intimate contact between the reactants. Good yields are obtained, however, using the stoichiometric amounts of each reactants, but in order to insure high yields an excess of alkaline earth metal or magnesium halide is preferred, i. e. a 50–100% excess. The excess alkaline earth metal or magnesium halide is recoverable and therefore it is not expensive to employ.

Titanium and zirconium phosphates may be produced by many known methods from most any titaniferous or zirconiferous materials. Methods for the preparation of titanium and zirconium phosphates are described in the examples presented below. The amount of titanium and phosphate may vary considerably as desired but it is preferred to maintain a $TiO_2/P_2O_5$ molar ratio between 1.0 and 1.7 to obtain high yields of titanium tetrahalide. The zirconium phosphate may also vary in composition but the $ZrO_2/P_2O_5$ molar ratio preferably should be held between 1.0 and 1.2.

The phosphate values present in the alkaline earth metal or magnesium phosphates produced may be recovered for reuse by many known methods. The phosphate produced may be reacted with sulfuric acid to form alkaline earth metal or magnesium sulfate and phosphoric acid. The phosphoric acid formed may be recycled to form additional amounts of titanium or zirconium phosphates.

In order to more fully illustrate the process of this invention, the following examples are presented to describe in detail the preferred embodiments of the present invention:

EXAMPLE I

*Preparation of titanium tetrachloride from titanium phosphate having a $TiO_2/P_2O_5$ molar ratio of 1.0*

A sulfate solution of titanium prepared from a titaniferous iron ore was used as the starting material. The solution contained 259 g. p. l. $TiO_2$, 70 g. p. l. Fe and 294 g. p. l. active sulfuric acid. The specific gravity of the solution was 1.680 at 24° C. The solution was treated according to the method described in Blumenfeld U. S. Patent Reissue No. 18,854 to precipitate the titanium values as titanium hydrate. The precipitated titanium hydrate was washed with acidified water and bleached with 125 g. p. l. sulfuric acid in the presence of metallic zinc. The bleached hydrate was then washed thoroughly with water. 600 grams of the washed titanium hydrate containing 200 grams of $TiO_2$ were mixed with 350 milliliters of 85% phosphoric acid to form a slurry. After thorough mixing the mixture was thoroughly dried by heating for 12 hours at 200° C. The dried cake was then calcined at 900° C. for 2 hours. The calcined cake was analyzed and contained 36% $TiO_2$ and 64% $P_2O_5$ which is equivalent to a $TiO_2/P_2O_5$ molar ratio of 1.0.

50 grams of the above calcined titanium phosphate were thoroughly dry-blended with 50 grams of anhydrous calcium chloride which is equivalent to the theoretical amount of calcium chloride to produce titanium tetrachloride, i. e. 2 mols calcium chloride. The mixture was placed in a 500-milliliter "Vycor" silica distilling flask which was placed in an electric furnace. The mixture was then heated rapidly to 600° C. in order to expel any traces of moisture still present in the mixture. The material was then rapidly heated to 825° C. and held for 2 hours. The titanium tetrachloride, as formed, volatilized from the mass and was distilled and condensed in a receiving container. The yield of titanium tetrachloride was 87%. The calcium phosphate in the flask was then treated with sulfuric acid to recover the phosphate values as phosphoric acid.

EXAMPLE II

*Preparation of titanium tetrachloride from titanium phosphate prepared from rutile ore*

Titanium phosphate was prepared from a rutile ore. The ore had the following analysis:

| | Per cent |
|---|---|
| $TiO_2$ | 92.1 |
| FeO | 2.7 |
| Gangue | 5.2 |

217 grams of the rutile ore were slurried in 506 grams of water. To this slurry were added 350 milliliters of 85% phosphoric acid and the mixture was boiled with stirring for 1 hour. The mass was then dried by heating at 200° C. for 12 hours. The dried mixture was then calcined at 900° C. for 3 hours. The calcined cake analyzed 42% $TiO_2$, 55% $P_4O_5$, 1% Fe, 2% gangue. This represents a $TiO_2/P_2O_5$ molar ratio of 1.36. 38.5 grams of the so-formed titanium phosphate were reacted with 86 grams of anhydrous magnesium chloride. The amount of magnesium chloride used was equivalent to 4.5 mols which is slightly more than 100% excess over the theoretical. The mixture was heated for 1 hour at 1000° C. and the yield of titanium tetrachloride was 86%.

EXAMPLE III

*Preparation of titanium tetrachloride from titanium phosphate having a $TiO_2/P_2O_5$ molar ratio of 1.68*

The bleached and washed titanium hydrate cake prepared in Example I was used as raw material for preparing this particular type of titanium phosphate material. 80 grams of the wet cake containing 24 grams of $TiO_2$ were mixed with 25 milliliters of 85% phosphoric acid. The slurry was dried by heating for 12 hours at 200° C. and the dried cake was calcined in the manner described in Example I. The product analyzed 49% $TiO_2$ and 51% $P_2O_5$ which gave a $TiO_2/P_2O_5$ molar ratio of 1.68.

50 grams of this titanium phosphate were mixed with 86 grams of magnesium chloride which is equal to a molar ratio of 3, i. e. approximately a 50% excess over the theoretical amount. The mixture was heated for ½ hour at 900° C. using the procedure described in Example I to produce titanium tetrachloride. The yield of titanium tetrachloride was 81%.

EXAMPLE IV

*Preparation of titanium tetrabromide from calcium bromide*

Using the procedure described in Example I, 50 grams of titanium phosphate prepared by the method used in Example I were mixed with 120 grams of calcium bromide, which is equivalent to 2.7 mols, i. e. approximately a 50% excess over the theoretical amount. The mixture was heated for ½ hour at 950° C. to produce titanium tetrabromide. The yield of titanium tetrabromide was 90%.

EXAMPLE V

*Preparation of titanium tetraiodide from calcium iodide*

50 grams of titanium phosphate described in Example I were mixed with 246 grams of calcium iodide which is equivalent to 3.7 mols, i. e. substantially a 100% excess over the theoretical. The mixture was treated according to the procedure described in Example I and was heated for 1 hour at 950° C. The yield of titanium tetraiodide was 70%.

EXAMPLE VI

*Preparation of titanium tetraiodide from magnesium iodide*

50 grams of titanium phosphate prepared by the method described in Example I were reacted with 188 grams of magnesium iodide, which is equivalent to 3 mols, i. e. substantially a 50% excess over the theoretical. The mixture was treated according to the procedure described in Example I and was heated for ½ hour at 1000° C. The yield of titanium tetraiodide was 72%.

EXAMPLE VII

*Preparation of zirconium tetrachloride from zirconium phosphate having a $ZrO_2/P_2O_5$ molar ratio of 1.0*

A zirconium sulfate solution was prepared by the reaction of sulfuric acid and zircon which had a concentration of 10% $ZrO_2$. This solution was cut with water to 30 grams per liter $ZrO_2$. 3000 milliliters of this zirconium sulfate solution were neutralized with agitation with 250 milliliters of ammonium hydroxide at 30° C. The neutralized mass was heated to 60° C. for 15 minutes and then filtered and washed with water to remove substantially all of the soluble sulfate values from the zirconium hydrate cake. The product weighed 500 grams and contained 45 grams $ZrO_2$. The hydrate was then mixed with 50 milliliters of 85% phosphoric acid at room temperature. This gave a $ZrO_2/P_2O_5$ molar ratio of 1.0. The product was then dried for 12 hours at 200° C. and the dried product was calcined for 2 hours at 1000° C. The calcined product analyzed 46.5% $ZrO_2$ and 53.5% $P_2O_5$.

50 grams of the above zirconium phosphate were mixed with 72 grams of magnesium chloride, i. e. molar ratio of 4.0, equivalent to a 100% excess. The mixture was then processed according to the method described in Example I. It was heated for 1 hour at 1000° C. to produce zirconium tetrachloride. The yield of zirconium tetrachloride was 98%.

By the process of this invention tetrahalides of titanium and zirconium may readily be produced from their respective phosphates by the direct reaction with an alkaline earth metal or magnesium halide. The method is direct and economical to employ. The reaction does not utilize a gaseous reactant and therefore does not require equipment necessary for handling of reactant gas. From the examples shown it is evident that the reaction is rapid and that high yields are obtained.

While this invention has been described and illustrated by the examples shown, it is not intended to be strictly limited thereto and other modifications and variations may be employed within the scope of the following claims.

We claim:

1. A process for production of tetrahalide of a metal selected from the group consisting of titanium and zirconium which comprises admixing a phosphate of said metal and a halide of a metal selected from the group consisting of alkaline earth metals and magnesium, and heating the mixture to a temperature of at least substantially as high as the melting point of said alkaline earth metal or magnesium halide until the tetrahalide of said first group mentioned metal is separated as a volatilized product.

2. A process for production of tetrahalide of a metal selected from the group consisting of titanium and zirconium which comprises admixing a phosphate of said metal and a halide of a metal selected from the group consisting of alkaline earth metals and magnesium, said halide selected from the group consisting of chloride, bromide and iodide, and heating the mixture to a temperature of at least substantially as high as the melting point of said alkaline earth metal or magnesium halide until the tetrahalide of said first group mentioned metal is separated as a volatilized product.

3. A process for production of tetrahalide of a metal selected from the group consisting of titanium and zirconium which comprises admixing a phosphate of said metal and calcium chloride, and heating the mixture to a temperature of at least substantially as high as the melting point of said calcium chloride until the tetrahalide of said metal is separated as a volatilized product.

4. A process for production of tetrahalide of a metal selected from the group consisting of titanium and zirconium which comprises admixing a phosphate of said metal and magnesium chloride, and heating the mixture to a temperature of at least substantially as high as the melting point of said magnesium chloride until the tetrahalide of said metal is separated as a volatilized product.

5. A process for production of tetrahalide of a metal selected from the group consisting of titanium and zirconium which comprises admixing a phosphate of said metal and a halide of a metal selected from the group consisting of alkaline earth metals and magnesium, and heating the mixture to a temperature from 800° C. to 900° C. until the tetrahalide of said first group mentioned metal is separated as a volatilized product.

6. A process for production of tetrahalide of a metal selected from the group consisting of titanium and zirconium which comprises admixing a phosphate of said metal and a halide of a metal selected from the group consisting of alkaline earth metals and magnesium, and heating the mixture to a temperature of at least substantially as high as the melting point of said alkaline earth metal or magnesium halide until the tetrahalide of said first group mentioned metal is volatilized, and condensing the volatilized tetrahalide product.

LEIF AAGAARD.
GEORGE E. BRONSON.

REFERENCES CITED

The following references are of record in the file of this patent:

McPherson and Henderson: "A Course in General Chemistry," pages 531, 547, third ed., Ginn & Co., N. Y.